United States Patent
Boss et al.

[11] Patent Number: 6,056,880
[45] Date of Patent: *May 2, 2000

[54] PROCESS FOR TREATING A WASTE SLUDGE OF BIOLOGICAL SOLIDS

[76] Inventors: Edward E. Boss, 161222 Wimbledon Forest Dr., Spring, Tex. 77379; Samuel L. Shepherd, 5211 Mulberry Grove, Kingwood, Tex. 77345

[*] Notice: This patent is subject to a terminal disclaimer.

[21] Appl. No.: 09/092,579

[22] Filed: Jun. 5, 1998

Related U.S. Application Data

[63] Continuation-in-part of application No. 08/910,849, Aug. 13, 1997, Pat. No. 5,868,942.

[51] Int. Cl.$^7$ ........................................................ C02F 1/48
[52] U.S. Cl. ........................... 210/695; 210/750; 210/752; 210/764; 210/766
[58] Field of Search ................................... 210/750, 752, 210/764, 766, 695

[56] References Cited

U.S. PATENT DOCUMENTS

| | | | |
|---|---|---|---|
| 4,038,180 | 7/1977 | Talbert | 210/10 |
| 4,500,428 | 2/1985 | Lynch et al. | 210/609 |
| 5,188,741 | 2/1993 | Zang et al. | 210/774 |
| 5,196,043 | 3/1993 | Wurtz | 71/12 |
| 5,482,528 | 1/1996 | Angell et al. | 71/12 |
| 5,635,069 | 6/1997 | Boss et al. | 210/609 |
| 5,888,453 | 3/1999 | Luker | 422/38 |
| 5,916,448 | 6/1999 | Fergen | 210/723 |

*Primary Examiner*—David A. Simmons
*Assistant Examiner*—Betsey J. Morrison
*Attorney, Agent, or Firm*—Harrison & Egbert

[57] ABSTRACT

A process for treating a waste sludge of biological solids including the steps of blending the sludge with an acid, mixing an oxide-chemical with the blended sludge so as to cause a reaction which elevates a temperature of the sludge, pressurizing the mixed sludge to a pressure of greater than 14.7 p.s.i.a. and retaining the mixed sludge at such pressure for a period of time of no less than 15 seconds, and discharging the pressurized mixed sludge. The step of pressurizing is accomplished by passing the mixed sludge as a flow into the pipe. The pipe has a length and diameter such that the flow of the mixed sludge takes longer than 15 seconds to pass through the pipe. The mixed sludge is heated as the flow passes through the pipe. An immersion heater or a magnetic field is installed so as to apply heat directly to the mixed sludge as the mixed sludge passes through the pipe.

15 Claims, 2 Drawing Sheets

PROCESS FOR TREATING A WASTE SLUDGE OF BIOLOGICAL SOLIDS

RELATED APPLICATIONS

The present application is a continuation-in-part of U.S. patent application Ser. No. 08/910,849, filed on Aug. 13, 1997 and entitled "Process for Treating a Waste Sludge of Biological Solids", now U.S. Pat. No. 5,868,942.

TECHNICAL FIELD

The present invention relates to processes for the treatment of waste sludges. More particularly, the present invention relates to processes that render biological waste sludges pathogen-free, vector-free and sellable.

BACKGROUND ART

In the past, various techniques have been developed for the purpose of sterilizing or decontaminating biological sludges and wastes. The most common process is the process of mixing lime with the sludge. The reaction of lime with the water in the sludge serves to elevate the temperature of the sludge to a maximum of 100° C.

In the past, various U.S. patents have issued relating to processes for the decontamination and treatment of wastewater sludges. For example, U.S. Pat. No. 4,038,180, issued on Jul. 26, 1977 to N. K. Talbert, describes a process of dewatering sewage sludge in which the sludge from a municipal or industrial sewage treatment facility is mixed with a mineral acid or anhydride thereof to release the entrapped water in the sludge. The resulting mixture of the sludge solids and diluted acid or anhydride is then mixed with a basic material, such as ammonia, such that the heat generated by the reaction of the base and the acid evaporates the water to form either a completely dry mixture of sludge solids and a salt or a mixture having a predetermined moisture content which may be air dried.

U.S. Pat. No. 4,500,428, issued on Feb. 19, 1985 to Lynch et al., describes a method for the treatment of a wastewater sludge using a pair of reaction vessels, sequentially, to treat the sludge. Both of the vessels are pressurized. The first vessel has an aerator for aerating the sludge. This vessel receives sulfuric acid and chlorine therein through a port. A dewatering device is provided upstream of the first vessel. The outlet of the first vessel is coupled to an inlet of the second vessel through another dewatering device. The second vessel creates a final-treatment chamber in which the sludge is exposed to ozone, air and lime.

U.S. Pat. Nos. 4,781,842 and 4,902,431, issued to Nicholson, teach processes for the decontaminating of wastewater sludges to a level which meets or exceeds U.S. E.P.A. process standards. The process mixes sludge with an alkaline material sufficient to raise the pH of the end product to 12 or higher for at least one day. This process will raise the temperature to 50° C., but will not sterilize the sludge nor does it eliminate the pathogenic organisms.

U.S. Pat. No. 4,306,978, issued to Wurtz, relates to a process of lime stabilization of wastewater treatment plant sludge. This patent discloses the dewatering of the sludge and intimately mixing calcium oxide to raise the temperature so as to produce a stabilized sludge particle.

U.S. Pat. No. 5,482,528, issued on Jan. 9, 1996 to Angell et al., teaches a pathogenic waste treatment process for the processing of solid waste and for the converting of such solid waste into useful products. This is accomplished by combining the waste with an acid, such as concentrated sulfuric acid, and a base, such as fly ash. These exothermically react and thermally pasteurize the waste and add mineral value to the product. Pozzolanic materials, such as fly ash, agglomerate the product. The calcium oxide in the fly ash reacts with sulfuric acid to form calcium sulfate dihydrate.

None of these prior art patented processes are capable of achieving temperatures, when mixed with the sludge, of greater than 100° C. None of the prior art techniques allow for the shorter drying times as required by 40 C.F.R. Subchapter O, Part 503.32.

U.S. Pat. No. 5,635,069 issued on Jun. 3, 1997 to the present inventors. This patent described a process for treating a waste sludge of biological solids which included the steps of mixing the sludge with an oxide-containing chemical and sulfamic acid so as to elevate the temperature of the sludge, pressurizing the mixed sludge to a pressure of greater than 14.7 p.s.i.a., and discharging the pressurized mixed sludge. The oxide-containing chemical could be either calcium oxide, potassium oxide, or potassium hydroxide. The sludge has a water content of between 5 and 85 percent. The oxide-containing chemical and the acid are reacted with the sludge so as to elevate the temperature of the sludge to between 50° C. and 450° C. The pressurized mixed sludge is flashed across a restricting orifice or passed into a chamber having a lower pressure. The evaporated liquid component can be condensed and used as part of the process or external of the process.

Experiments with the process of this prior art patent have disclosed that this process is extremely effective in the treatment of waste sludges. However, certain improvements were found possible with the process of U.S. Pat. No. 5,635,069 which renders the process more economic and more assuredly pathogen-free. In particular circumstances, it was found that the cost of the oxide-containing chemical could be replaced, in certain environments, by applying heat directly to the pressurized sludge. In other circumstances, if heat is applied directly to the pressurized mixed sludge, then the sulfamic acid could be replaced by less expensive chemicals, such as carbon dioxide. In certain circumstances, it was found that the use of electricity for the heating of the pressurized sludge was less than the cost of certain chemicals used to elevate the temperature of the sludge.

It is important to note that in existing processes for the treating of waste sludges, it is common to use a conveyor belt onto which the dewatered sludges are placed. This conveyor belt will pass the dewatered sludges under infrared radiation so as to effectively heat the sludge. Unfortunately, the use of such radiant energy for the heating and pathogen destruction of the waste sludge is extremely unefficient. In other cases, the application of such infrared energy to the waste sludge will cause serious odor and toxicity problems. It was found that the use of such infrared radiation for the treating of pathogens in the waste sludge had an energy efficiency of only 18 percent with respect to the amount of heat that could be applied to the waste sludges. As such, a need developed for the cost-effective and efficient pathogen-destruction and heating of the waste sludge so as to conform with E.P.A. requirements.

It is an object of the present invention to provide a process for rendering a biological waste sludge pathogen-free and vector-free.

It is another object of the present invention to provide a process that converts the biological waste sludge into a sellable end product.

It is a further object of the present invention to provide a process that eliminates or reduces waste incineration and landfilling of waste sludges.

It is another object of the present invention to provide a process which reduces the odor emitted during the heating of the waste sludge.

It is still a further object of the present invention to provide a process that efficiently utilizes energy for the heating of the waste sludge.

It is a further object of the present invention to provide a process that is adaptable for optimizing the cost of chemicals used for the treatment of the waste sludge.

It is still a further object of the present invention to provide a process for the treating of waste sludges that is cost effective, easy to use, and easy to install.

These and other objects and advantages of the present invention will become apparent from a reading of the attached specification and appended claims.

SUMMARY OF THE INVENTION

The present invention is a process for treating waste sludge of biological solids which comprises the steps of: (1) blending the sludge with an acid; (2) mixing an oxide-containing chemical with the blended sludge so as to cause a reaction which elevates a temperature of the sludge; (3) pressurizing the mixed sludge to a pressure of greater than 14.7 p.s.i.a. for a period of time of no less than 15 seconds; and (4) discharging the pressurized mixed sludge. In the present invention, the sludge has a solids content of greater than 7 percent. The oxide-containing chemical is selected from the group consisting of calcium hydroxide, sodium hydroxide, potassium hydroxide, lithium hydroxide, calcium oxide, sodium oxide, potassium oxide and lithium oxide.

In the present invention, it is possible that the steps of blending and mixing occur simultaneously. In the preferred embodiment of the present invention, the acid is sulfamic acid. However, with the proper heating of the waste sludge during the step of pressurizing, it is possible that carbonic acid could be the acid which is used. Such a carbonic acid would be produced by the reaction of carbon dioxide with the waste sludge.

The sludge is dewatered prior to the step of blending. This dewatering causes the sludge to have a water content of less than 93 percent. Ideally, the mixed sludge is pressurized to a pressure of greater than 20.7 p.s.i.a.

The present invention pressurizes the mixed sludge by passing the mixed sludge as a flow into a pipe. The pipe maintains the mixed sludge at the pressure of greater than 14.7 p.s.i.a.. The pipe has a length and diameter such that the flow of the mixed sludge takes longer than 15 seconds to pass through the pipe. The mixed sludge is heated as the flow passes through the pipe. The heating of the mixed sludge can be accomplished in two different ways. Preferably, an immersion heater is installed into the interior of the pipe. The immersion heater applies heat directly to the mixed sludge. Alternatively, a magnetic field can be applied around the pipe as the mixed sludge flows through the pipe. The magnetic field can be tuned to a frequency which causes a desired elevation of the temperature of the mixed sludge.

In the present invention, the step of discharging includes the steps of: (1) flashing the pressurized mixed sludge across a restricting orifice; and (2) evaporating a liquid component of the sludge.

DETAILED DESCRIPTION OF THE INVENTION

Figure 1:
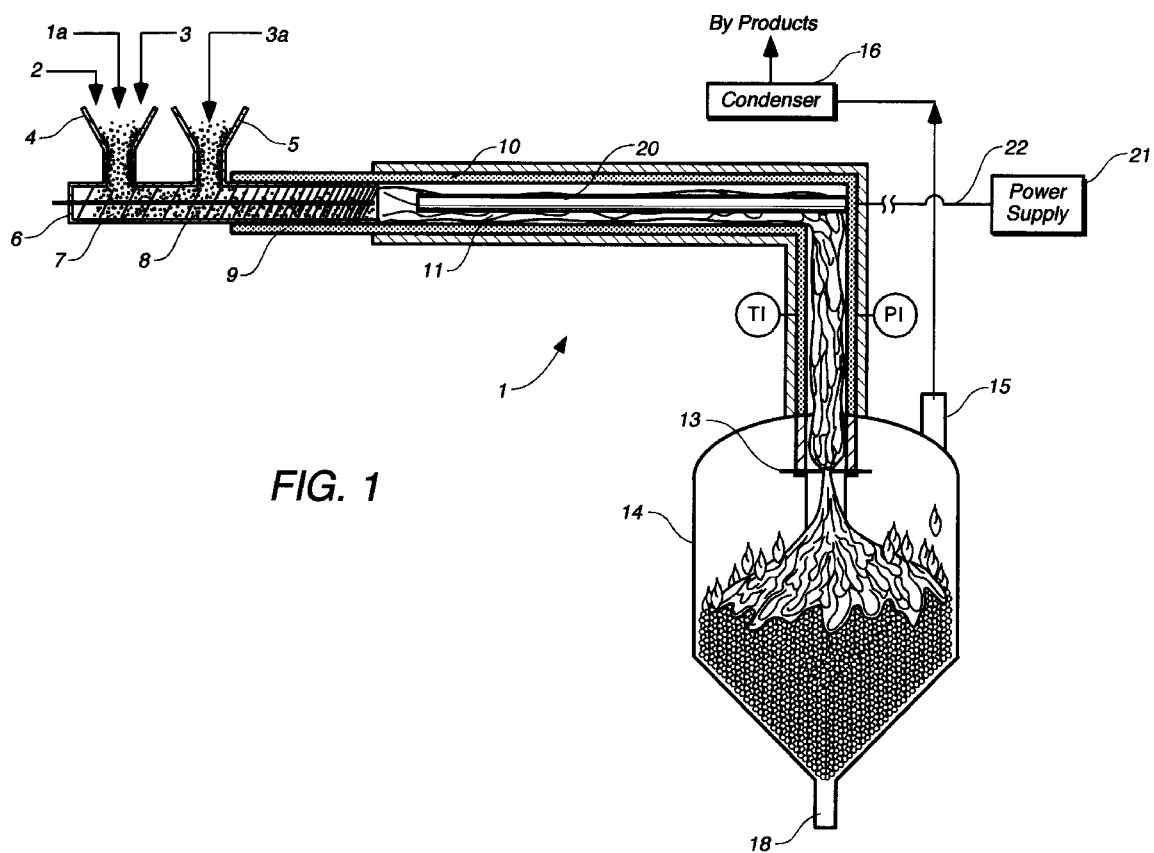
FIG. 1 is a flow diagram showing the process of the present invention for the treatment of waste sludges utilizing an immersion heater for the heating of the waste sludges.

Referring to FIG. 1, there is shown at 1 the process for the treatment of a waste sludge of biological solids in accordance with the preferred embodiment of the present invention. In the process 1 of the present invention, the sludge 1a and the acid 2 are delivered together into a feed hopper 4. Within the concept of the present invention, the sludge 1a is a waste sludge, including sewage sludges and animal feces. The sludge 1a will have a solids content of greater than 7 percent or a water content of less than 93 percent. It is important for the sludge 1a to have a water content such that the remaining chemicals introduced to the process can properly react with the sludge. If the sludge 1a has a water content of greater than 93 percent, then it should be suitably dewatered prior to introduction into the process 1 of the present invention. Such dewatering can occur in a conventional manner by using belt presses or centrifuges. It is only necessary for the dewatering process to reduce the water content to below 93 percent.

Within the present invention, the preferred acid 2 is sulfamic acid. Sulfamic acid is otherwise known as amidosulfonic acid ($H_3NO_3S$). Sulfamic acid is obtained from chlorosulfonic acid and ammonia or by treating urea with $H_2SO_4$. Typically, sulfamic acid is otherwise used in acid cleaning, in nitrite removal, and in chlorine stabilization for use in swimming pools, colling towers, and paper mills.

Importantly, within the concept of the present invention, the acid 2 which is used is not limited to sulfamic acid. Various other acids could possibly be used provided a suitable amount of heat could be imparted to the sludge as it passes a later point in the process of the present invention. For example, carbon dioxide could be substituted for the sulfamic acid. The carbon dioxide would form carbonic acid when reacted with the waste sludge. Although experiments have shown that such carbonic acid would not optimally work in the process of the present invention, it would be possible to use such carbonic acid, or other acids, so as to accomplish the purposes of the present invention.

After the sludge 1a and the acid 2 are added together into the feed hopper 4, the mixture is auger fed into the feed section 7 of a screw conveyor 6. The screw conveyor 6 will rotate so as to transport the mixture of the sludge 1a and the acid 2 to a feed section. During the transport of the mixture of the sludge 1a and the acid 2, these materials are mixed together by the screw conveyor.

At the feed section 8, an oxide-containing chemical 3 is added to the feed section. In particular, the oxide-containing chemical 3 is delivered into the feed hopper 5 and auger delivered to the feed section 8. As used in the present invention, the oxide-containing chemical 3 can be either calcium hydroxide, sodium hydroxide, potassium hydroxide, lithium hydroxide, calcium oxide, sodium oxide, potassium oxide and lithium oxide. In the preferred embodiment of the present invention, the oxide-containing chemical could be calcium oxide. Other ingredients can be added to the feed section 8, if desired. These other ingredients could be passed along with the oxide-containing chemical 3 or otherwise delivered into the feed section. These materials are then transported to the compression zone 9 of the screw conveyor 6. This compression zone 9 serves to increase the pressure of the mixed sludge to the desired value.

Specifically, the compression zone 9 should increase the pressure of the mixed sludge to a pressure of greater than 14.7 p.s.i.a.. Experimentation has found that the desired effects of the present invention are achieved by pressurizing the mixed sludge to a pressure of between 14.7 p.s.i.a. and 120 p.s.i.a.. Importantly, the preferred pressure is greater than 20.7 p.s.i.a.. At such pressures, water is retained in the mixture and is not flashed from the system. When the water is flashed by pressures of less than 20.7 p.s.i.a., there is a loss of heat of approximately 1,000 BTU per pound of water. As such, to preserve the optimal heating effects in the process of the present invention, it would be desirable to maintain the pressure on the mixture to a level which would prevent the flashing of the water. Furthermore, the higher pressure keeps any ammonia ($NH_3$) from flashing and retains the ammonia for intimate mixing with the pathogens of the waste sludge. The ammonia byproduct produced from the process of the present invention is an effective chemical for the killing of pathogens in the sludge.

The adding of the oxide-containing chemical to the mixture and the increasing of pressure through the motive force of the screw conveyor 6 causes an exothermic reaction along the reaction section 11. The combination of calcium oxide and the water within the waste sludge produces calcium hydroxide and liberates 235 kcal/mole of heat. This raises the temperature from ambient to 100° C. in 0.5 seconds. The sulfamic acid 2 then reacts with the calcium hydroxide to form calcium salts. This raises the temperature from 100° C. to 140° C. in less than 1 second.

In the present invention, the oxide-containing chemical can be produced from any source, such as kiln dust or lime dust. The oxide-containing chemical will make up between 5 percent and 50 percent of the waste sludge 1a by weight. The acid that is added, in any form, whereby the weight ratio of acid to the oxide-containing chemical is between 0.33:1 and 1:1. In general, the temperature of the reaction chamber 11 will be between 50° C. and 450° C.

The material which exits the screw conveyor 6 enters the reaction chamber 11 having insulation 10 extending therearound. This reaction chamber 11 can contain static mixing elements. The material is continuously mixed as it progresses through the predetermined length of the pipe. The material is continuously under pressure within the pipe 11 so as to prevent a premature flashing of the water within the mixed sludge. The mixed sludge will pass as a flow through the length of the pipe 11. The pipe 11 should be sized so as to have a length and diameter such that the flow of the mixed sludge will continue through the pipe 11 for a period of no less than 15 seconds. The intimate mixing of the ammonia with the pathogens of the mixed sludge at such an elevated temperature and under such an elevated pressure will effectively destroy any pathogens or vectors which would occur within the mixed sludge. The intimate contact of the sludge with the ammonia provides great disinfecting action to the waste sludge. The pressure within the pipe 11 will prevent the ammonia from flashing. Experiments with the present invention have shown that it will reduce pathogens from 2.2 million colonies per gram to less than 10 colonies per gram.

Importantly, in the present invention, an immersion heater 20 is installed into the interior of the pipe 11. The immersion heater 20 is a heating element which is in the form of a tube having a sealed end. The immersion heater 20 will extend through a wall in the pipe 11 and through a substantial length of the pipe 11. A power supply 21 is electrically connected by line 22 to the immersion heater 20 so as to provide suitable power to the immersion heater 20. Preferably, the immersion heater 20 can produce heat of up to 500° F. The application of such heat in the area of the interior of pipe 11 will cause the mixed sludge to also increase in temperature. This further enhances the pathogen-killing behavior of the process of the present invention in the interior of the pipe 11. The immersion heater 20 can be used to produce heat where the cost of the heat from the electricity is less than the cost of heat from lime. If the immersion heater 20 provides 14 degrees of additional temperature, then it reduces the lime requirement by approximately 20 percent. Since the pipe 11 has insulation 10 extending therearound, any heat produced by the immersion heater 20 is imparted directly into the mixed sludge. Experiments have shown that this system is at least 95 percent efficient in passing heat into the sludge. This is in contrast to the approximately 18 percent efficiency associated with the aforedescribed infrared heaters used with conveyor belts for the treatment of sludges. As such, it can be seen that the immersion heater 20 as used within the pipe 11 enhances the efficiency and optimizes chemical consumption associated with the process 1 of the present invention.

After reacting within the pipe 11, the mixed sludge is flashed across a restricting orifice 13. This restricting orifice can be an opening, a die, or a valve. The orifice 13 is positioned generally adjacent to the end of the pipe 11. The orifice 13 will communicate with a flash chamber 14. As such, the material is delivered under pressure to the orifice 13 and then released into the flash chamber 14. A vapor, including water vapor, $NH_3$, $SO_2$, and $SO_3$, will exit the flash chamber 14 through the vent 15. This vapor can then pass through a condensor, or compressor, 16. The products of the process can then be sold as valuable byproducts external of the system.

In order to properly remove the water from the sludge, it is important that the flash chamber 14 has an interior pressure of between 0 and 14.7 p.s.i.a.. As such, when the mixed sludge passes through the orifice 13, the sludge will be exposed to a lesser pressure. This causes the water and other volatile components of the sludge to be evaporated. As a result, the water content and the temperature of the sludge are appropriately reduced. The heat of vaporization of the flashed material can be passed directly back to the sludge by using heat exchangers, pumps or vapor compressors. After the sludge passes into the flash chamber 14, the resulting sludge will be a sterile decontaminated product which is pathogen-free and vector-free. This product will meet or exceed U.S. E.P.A. standards.

The sterilized sludge then exists the flash chamber 14 through the discharge opening 18.

The geometric configuration of the reaction chamber 11 is dependent upon the layout configuration of the facility in which it is used. The reaction chamber 11 should have a sufficient diameter and length so as to provide a residence time of the sludge within the chamber of greater than 15 seconds. The insulation 10 is provided so as to eliminate heat loss and to produce an adiabatic reaction.

Tests have been conducted with the configuration of the present invention. The experimental data associated with the process of the present invention is identified in Table I hereinbelow. During these experiments, oxalic acid was included in the experiments. However, it was later determined that the oxalic acid is a temperature depressor and can be a poison. As such, oxalic acid should not be included as part of the process of the present invention. Other test results have shown that acids such as $HNO_3$ acid, acetic acid, and vinegar acid do not achieve the necessary reaction so as to significantly increase the temperature of the waste sludge.

TABLE I

| EXP # | CaO gr. | OXALIC ACID gr. | SULFAMIC ACID gr. | WATER cc. | TEMP F. | TIME TO REACH TEMP mins. |
|---|---|---|---|---|---|---|
| 1 | 169 | 75 | 56 | 24 | 300 | 8 |
| 2 | 189 | 75 | 112 | 24 | 607 | 8 |
| 3 | 337 | 153 | 224 | 24 | 618 | 8 |
| 4 | 337 | 306 | 112 | 24 | 580 | 4 |
| 5 | 189 | 75 | 168 | 24 | 400 | 1 |
| 6 | 169 | 75 | 112 | 24 | 667 | 5 |
| 7 | 50 | 40 | 87 | 24 | 250 | 1 |
| 8 | 169 | 0 | 130 | 24 | 840 | 1 |
| 9 | 169 | 130 | 0 | 24 | 370 | 1 |
| 10 | 169 | 0 | 0 | 12 | 213 | 0.2 |
| 11 | 0 | 75 | 0 | 12 | 0 | 1 |
| 12 | 0 | 0 | 56 | 12 | 0 | 1 |
| 13 | 169 | 130 | 0 | 24 | 500 | 3 |
| 14 | 189 | 0 | 130 | 24 | 820 | 1 |
| 15 | 85 | 0 | 85 | 24 | 700 | 1 |
| 16 | 189 | 0 | 130 | 24 | 750 | 1 |
| 17 | 169 | 0 | 130 | 72 | 750 | 1 |
| 18 | 169 | 0 | 188 | 24 | 860 | 1 |

Figure 2:
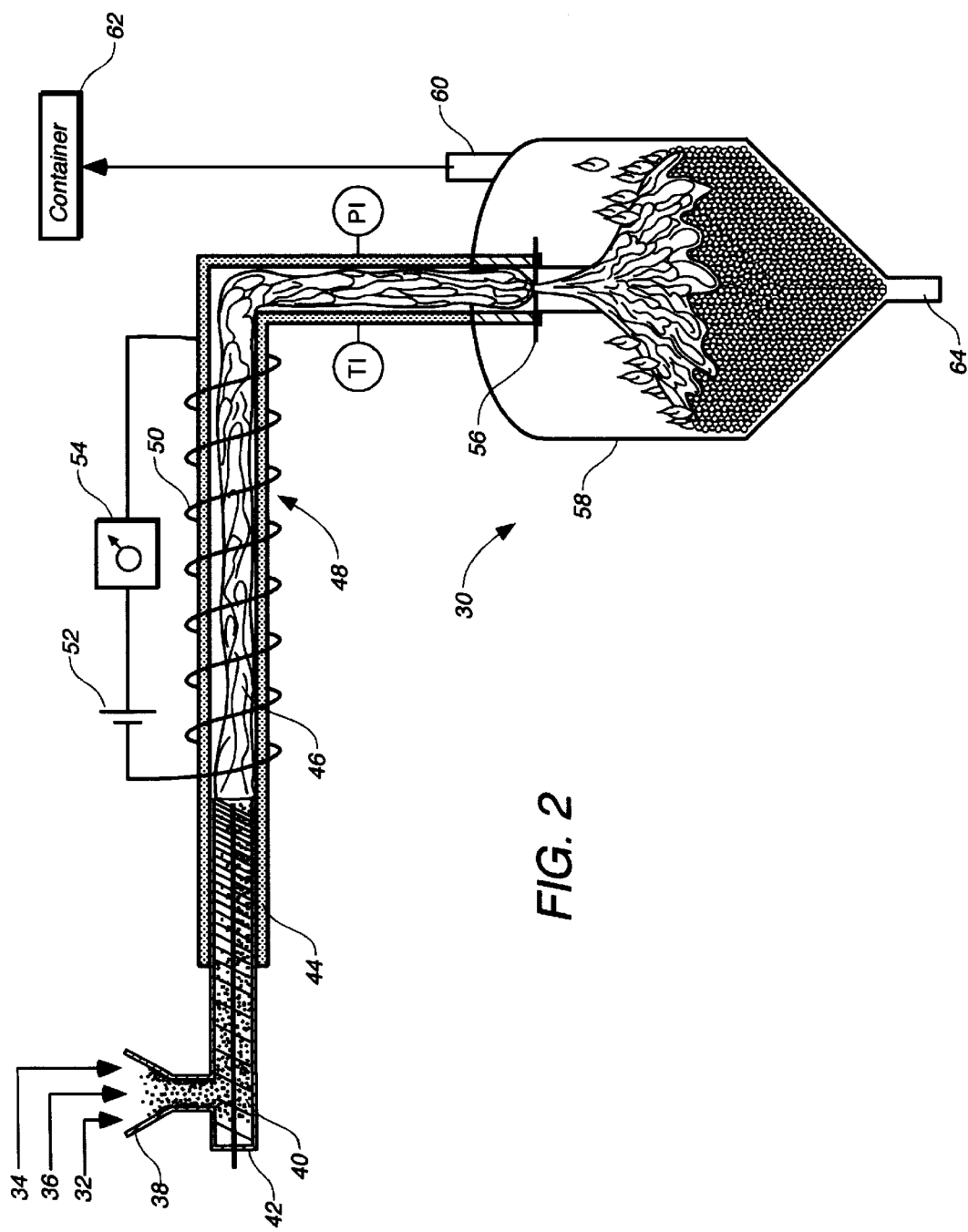
FIG. 2 is a flow diagram showing the process of the present invention as using a magnetic field for the heating of the waste sludge as it passes through the pipe.

FIG. 2 shows an alternative form of the present invention. In FIG. 2, there is shown at 30 an alternative process for the treatment of a waste sludge of biological solids. In the process 30, the sludge 32, the acid 34 and the oxide-containing chemical 36 are introduced simultaneously into feed hopper 38. As such, these components can be added simultaneously into the process 30. The sludge 32, the acid 34 and the oxide-containing chemical 36 will have a configuration similar to that described herein previously. After the sludge 32, the acid 34 and the oxide-containing chemical 36 are introduced into the feed hopper 38, the mixture is auger fed into the compression zone 44. In the transport of the mixture of the sludge 32, the acid 34 and the oxide-containing chemical 36, these materials are mixed together by the screw conveyor. The compression zone 44 serves to increase the pressure of the mixed sludge to the desired value. Specifically, the compression zone 44 should increase the pressure of the mixed sludge to a pressure of greater than 14.7 p.s.i.a..

The material which exits the screw conveyor 42 enters the pipe 46. Pipe 46 can be suitably insulated. The pipe 46 can contain static mixing elements. Material is continuously mixed as it progresses through the predetermined length and diameter of pipe 46. The mixed sludge is continuously under pressure so as to prevent a premature flashing of the ammonia or of the water. A temperature monitor TI and a pressure monitor PI provided along the pipe 46 so as to provide suitable monitoring of the reaction process and can provide an input for suitable reaction control systems.

In the process 30, as shown in FIG. 2, a magnetic field generating apparatus 48 is provided. This magnetic field generating apparatus 48 includes a coil 50 which is wrapped around the exterior of the pipe 46. A 440 volt power source 52 is provided so as to generate a suitable magnetic field. A variable frequency controller 54 allows the magnetic field generated by the magnetic field generating apparatus 48 to be suitably tuned for the optimal heating of the mixed sludge passing through the interior of pipe 46.

In the process of the present invention, the water in the mixed sludge passing through the pipe 46 is slightly polar. The process of the present invention is a magnetohydrodynamic process. There is a frequency at which the water molecules flip. At the optimal frequency, heat is generated by the flipping of the water molecules. Typically, the frequency should be between 100 and 3,000 cycles per second. The winding 50 extends around the pipe 46. The variable frequency controller 54 is adaptable so as to vary the cycle/second acting on the mixed sludge on the interior of the pipe. The variable frequency controller 54 allows the magnetic field to be "tuned" to the composition of the mixed sludge. The frequency can be tuned until it reaches an optimal frequency. At such an optimal frequency, a maximum amount of heat will be imparted by the water molecules to the mixed sludge on the interior of pipe 46. The temperature monitor TI and the pressure monitor PI can be examined so as to facilitate the proper "tuning" of the magnetic field generating apparatus 48.

The magnetic field generating apparatus 48 achieves certain advantages over the immersion heater described in association with FIG. 1. For example, since the winding 50 extends around the exterior of pipe 46, there is no flow restriction on the interior of pipe 46. Additionally, the winding 50 will not be subject to the corrosion effects of the mixed sludge. On the other hand, it is uncertain whether the economics for the magnetic field generating apparatus 48 equal the economics of the prior embodiment. Additionally, it is possible that the magnetic field generating apparatus 48 could add installation and safety concerns which would not be created by the immersion heater of FIG. 1.

After being reacted and heated within the interior of pipe 46, the mixed sludge is flashed across restricting orifice 56 at the end of pipe 46. The orifice 56 will communicate with the interior of flash chamber 58. As such, the mixed sludge is delivered under pressure to the orifice 56 and then released into the flash chamber 58. The vapor can then be released through vent 60. The byproducts released through vent 60 can then be accumulated in container 62 for reuse or resale. The sterilized sludge exits the flash chamber 58 through the discharge opening 64. Experiments with the present invention have shown that the byproducts which exit the flash chamber 58 through vent 60 can be easily resold as industrial or commercial gases.

The foregoing and description of the invention is illustrative and explanatory thereof. Various changes in the details of the illustrated construction or of the steps of the described method can be made within the scope of the appended claims without departing from the true spirit of the invention. The present invention should only be limited by the following claims and their legal equivalents.

We claim:

1. A process for treating a waste sludge of biological solids comprising:

blending the sludge with an acid, the sludge having a solids content of greater than 7%;

mixing an oxide-containing chemical with the blended sludge so as to cause a reaction which elevates a temperature of the sludge, said oxide-containing chemical selected from the group consisting of: calcium hydroxide, sodium hydroxide, potassium hydroxide, lithium hydroxide, calcium oxide, sodium oxide, potassium oxide and lithium oxide;

pressurizing the mixed sludge to a pressure of greater than 14.7 p.s.i.a. for a period of time of no less than 15 seconds, said step of pressurizing comprising:

passing the mixed sludge as a flow into a pipe, said pipe maintaining the mixed sludge at the pressure of greater than 14.7 p.s.i.a., said pipe having a length such that the flow of the mixed sludge takes longer than 15 seconds to pas through said pipe; and heating the mixed sludge as the flow passes through said pipe by applying a magnetic field around said pipe as the mixed sludge flows through said pipe; and discharging the pressurized mixed sludge.

2. The process of claim 1, the steps of blending and mixing occurring simultaneously.

3. The process of claim 1, said acid being sulfamic acid.

4. The process of claim 1, further comprising:

dewatering the sludge prior to the step of blending, said dewatering causing the sludge to have a water content of less than 93%.

5. The process of claim 1, said step of pressurizing comprising:

pressurizing the mixed sludge to a pressure of greater than 20.7 p.s.i.a.

6. The process of claim 1, further comprising:

installing an immersion heater into an interior of said pipe, said immersion heater applying heat to the mixed sludge.

7. The process of claim 1, further comprising:

tuning the magnetic field to a frequency which causes a desired elevation of the temperature of the mixed sludge.

8. A process for treating a waste sludge of biological solids comprising:

blending the sludge with an acid, the sludge having a solids content of greater than 7%;

mixing an oxide-containing chemical with the blended sludge so as to cause a reaction which elevates a temperature of the sludge, said oxide-containing chemical selected form the group consisting of: calcium hydroxide, sodium hydroxide, potassium hydroxide, lithium hydroxide, calcium oxide, sodium oxide, potassium oxide and lithium oxide;

pressurizing the mixed sludge to a pressure of greater than 14.7 p.s.i.a. for a period of time of no less than 15 seconds; and discharging the pressurized mixed sludge, said step of discharging comprising:

flashing the pressurized mixed sludge across a restricting orifice; and evaporating a liquid component of the flashed sludge.

9. A process for treating a waste sludge of biological solids comprising:

blending the sludge with an acid, the sludge having a water content of less than 93%;

pressurizing the blended sludge to a pressure of greater than 14.7 p.s.i.a.;

passing the pressurized sludge as a flow through a pipe, said pipe maintaining the blended sludge at a pressure of greater than 14.7 p.s.i.a.;

heating the pressurized sludge as the pressurized sludge passes through said pipe, said step of heating comprising:

applying a magnetic field around said pipe as the pressurized sludge flows through said pipe; and tuning the magnetic field to a frequency which causes a desired elevation of the temperature of the pressurized sludge within said pipe; and discharging the pressurized mixed sludge.

10. The process of claim 9, said pipe having a length and a diameter such that the flow of the pressurized sludge takes longer than 15 seconds to pass through said pipe.

11. The process of claim 9, said step of heating comprising:

installing an immersion heater into an interior of said pipe such that said immersion heater directly heats the pressurized sludge as the pressurized sludge passes thereby.

12. The process of claim 9, said step of blending further comprising:

blending the sludge with an acid and with an oxide-containing chemical, said oxide-containing chemical selected from the group consisting of calcium hydroxide, sodium hydroxide, potassium hydroxide, lithium hydroxide, calcium oxide, sodium oxide, potassium oxide and lithium oxide.

13. The process of claim 9, said acid being carbonic acid as produced from a reaction of carbon dioxide with the sludge.

14. The process of claim 9, said acid being sulfamic acid.

15. The process of claim 9, said step of pressurizing comprising:

pressurizing the blended sludge to a pressure of greater than 20.7 p.s.i.a.

* * * * *